United States Patent [19]

Simpson

[11] 4,248,501

[45] Feb. 3, 1981

[54] LIGHT CONTROL DEVICE

[75] Inventor: George R. Simpson, New York, N.Y.

[73] Assignee: Bos-Knox, Ltd., Tulsa, Okla.

[21] Appl. No.: 916,094

[22] Filed: Jun. 16, 1978

[51] Int. Cl.[3] .................... G02F 1/01

[52] U.S. Cl. .................... 350/266; 350/360

[58] Field of Search .................... 350/359, 360, 285, 266

[56] References Cited

U.S. PATENT DOCUMENTS

| | | | |
|---|---|---|---|
| 1,984,683 | 12/1934 | Jenkins | 350/285 |
| 3,553,364 | 1/1971 | Lee | 350/285 |
| 3,897,997 | 8/1975 | Kalt | 350/285 |
| 3,989,357 | 11/1976 | Kalt | 350/285 |

OTHER PUBLICATIONS

Langner, CRT Display Target. IBM Technical Disclosure Bulletin, vol. 13 (Aug. 1970), pp. 60 & 61.

Langner, Light Gating Brightens CRT Image for Large Projection Displays. Electronics (Dec. 7, 1970), pp. 78–83.

*Primary Examiner*—William L. Sikes

*Attorney, Agent, or Firm*—Davis, Hoxie, Faithfull & Hapgood

[57] ABSTRACT

An electromechanical display element is provided for use in light reflective and light transmissive display arrays. The display element has a moveable electrode electrostatically controllable between a curled position removed from a stationary electrode, and an uncurled position overlying the stationary electrode to modify the light reflective or transmissive character of the display element. Embodiments of the moveable electrodes are provided which readily can be manufactured for use in either type of array. Stationary electrodes having a plurality of discrete conductive regions are provided to facilitate the control of display elements in an array. Embodiments of dielectric insulators and external circuitry are provided which avoid operating problems and manufacturing complexities associated with residual electric polarization.

27 Claims, 14 Drawing Figures

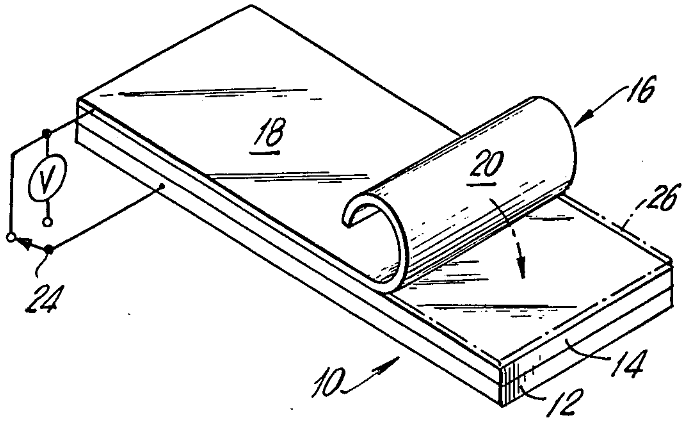
FIG. 1
FIG. 2
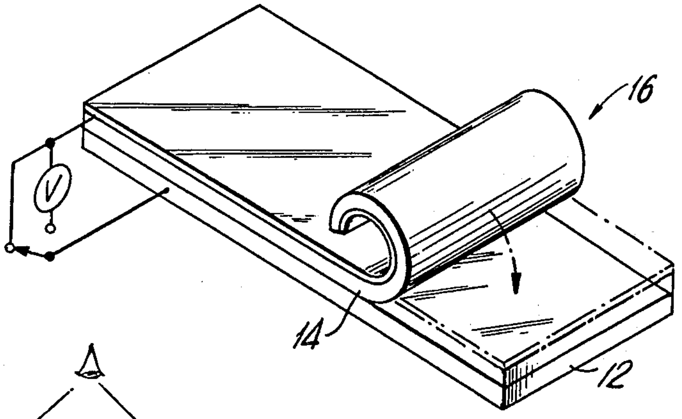
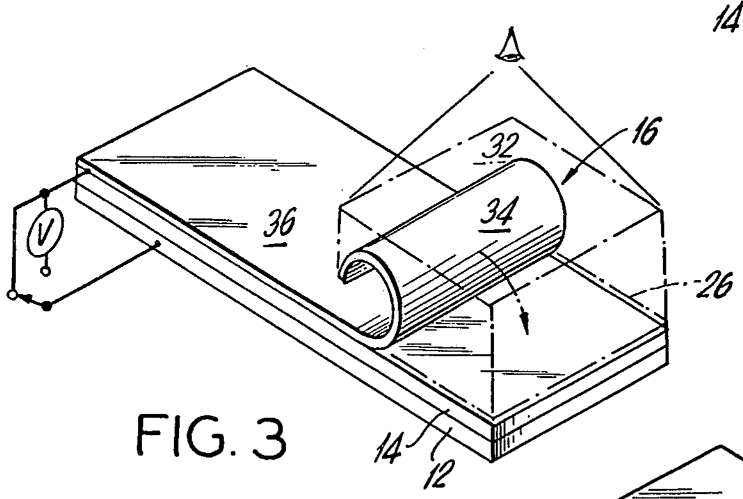
FIG. 3
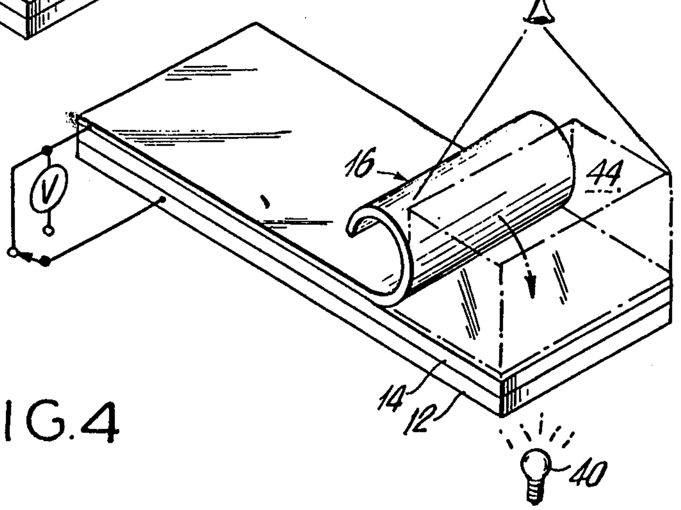
FIG. 4

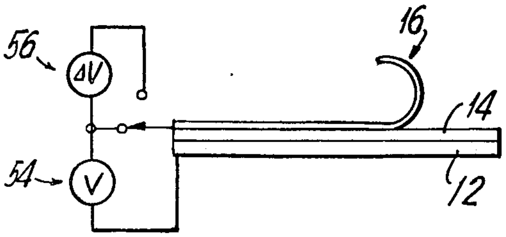
FIG. 5
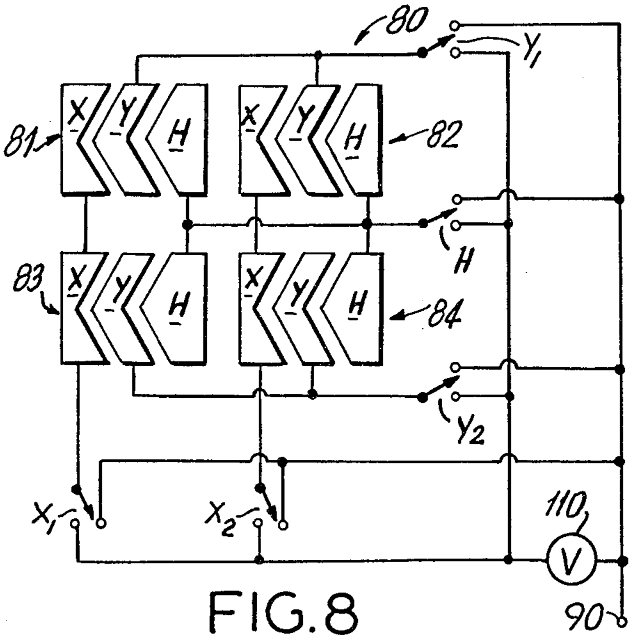
FIG. 8
FIG. 6
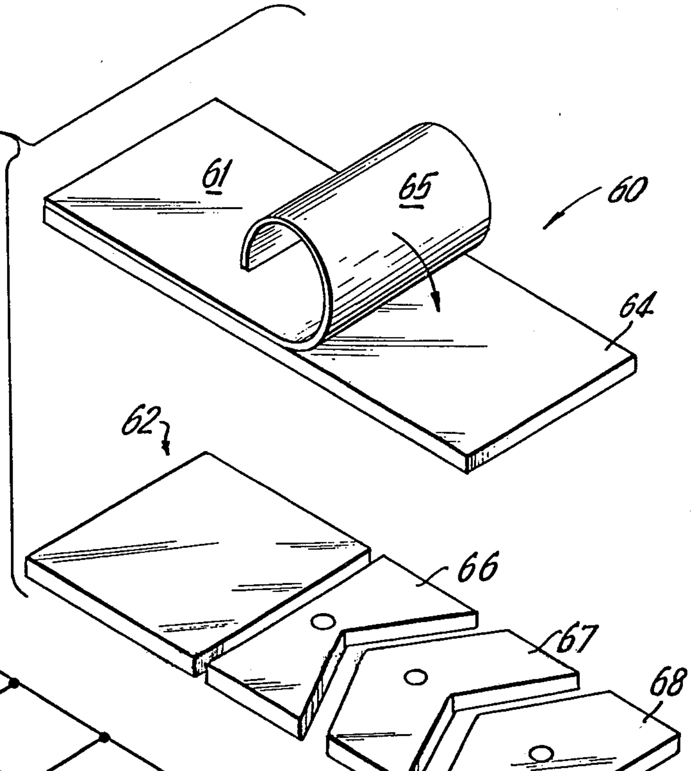
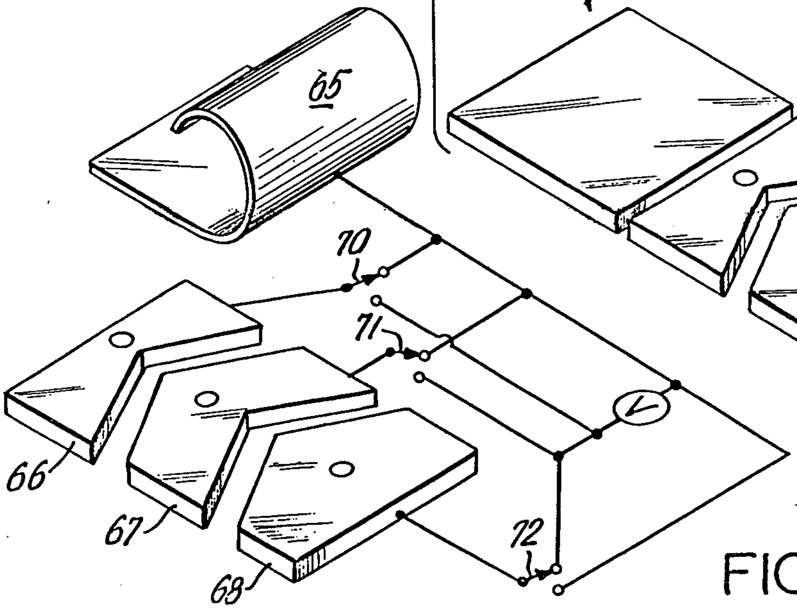
FIG. 7

LIGHT CONTROL DEVICE

BACKGROUND OF THE INVENTION

This invention relates to an electrostatically controllable electromechanical display device for use in light transmissive and light reflective displays.

The prior art contains various examples of electrostatic display elements. One type of device such as is shown in U.S. Pat. No. 1,984,683 and 3,553,364 includes light valves having flaps extending parallel with the approaching light, with each flap electrostatically divertable to an oblique angle across the light path for either a transmissive or reflective display. U.S. Pat. No. 3,897,997 discloses an electrode which is electrostatically wrapped about a curved fixed electrode to affect the light reflective character of the fixed electrode. Further prior art such as is described in ELECTRONICS, Dec. 7, 1970, pp. 78–83 and I.B.M. Technical Disclosure Bulletin, Vol. 13, No. 3, August 1970, uses an electron gun to electrostatically charge selected portions of a deformable material and thereby alter its light transmissive or reflective properties.

SUMMARY OF THE INVENTION

The present invention provides an electrostatically controllable electromechanical display device for light reflective or light transmissive display arrays. Each display element in the array can be individually controlled to enable the production of a variety of visual displays, including black and white and multicolor digital and pictorial displays.

A display element of the invention has a stationary electrode with an adjacent moveable electrode electrostatically controllable between a curled position removed from the stationary electrode and an uncurled position overlying the stationary electrode. In a preferred embodiment, the stationary electrode has a flat surface normal to the light path, with the uncurled electrode lying adjacent to and covering the stationary electrode flat surface. The electrodes can control light transmission or can affect light reflection qualities for a light reflective device.

Non-conductive means is provided between the stationary electrode and the uncurled moveable electrode which can, for example, take the form of an insulative layer on either the stationary or moveable electrode. Particular embodiments of dielectric insulators and external circuitry are provided to avoid operational difficulties arising from residual electric polarization of the dielectric insulators.

Embodiments of stationary electrodes having multiple discrete conductive regions or segments are provided to enable individual control of elements within a display array. Each segment of an electrode can be addressed separately and latched in an activated or unactivated state to cause, for example, selected elements within an array to become actuated, or to cause selected elements to remain actuated while other elements are not.

BRIEF DESCRIPTION OF THE DRAWINGS

FIG. 1 is a perspective view of an embodiment of a display element.

FIG. 2 is a perspective view of another embodiment of a display element.

FIG. 3 is a perspective view of a light reflective embodiment.

FIG. 4 is a perspective view of a light transmissive embodiment.

FIG. 5 is a schematic view of another embodiment.

FIG. 6 is a perspective, exploded view illustrating another embodiment of a stationary electrode in a display element.

FIG. 7 is a perspective, exploded view illustrating another embodiment of a stationary electrode in a display element.

FIG. 8 is a schematic view illustrating an embodiment of a display array.

DETAILED DESCRIPTION

Figure 9:
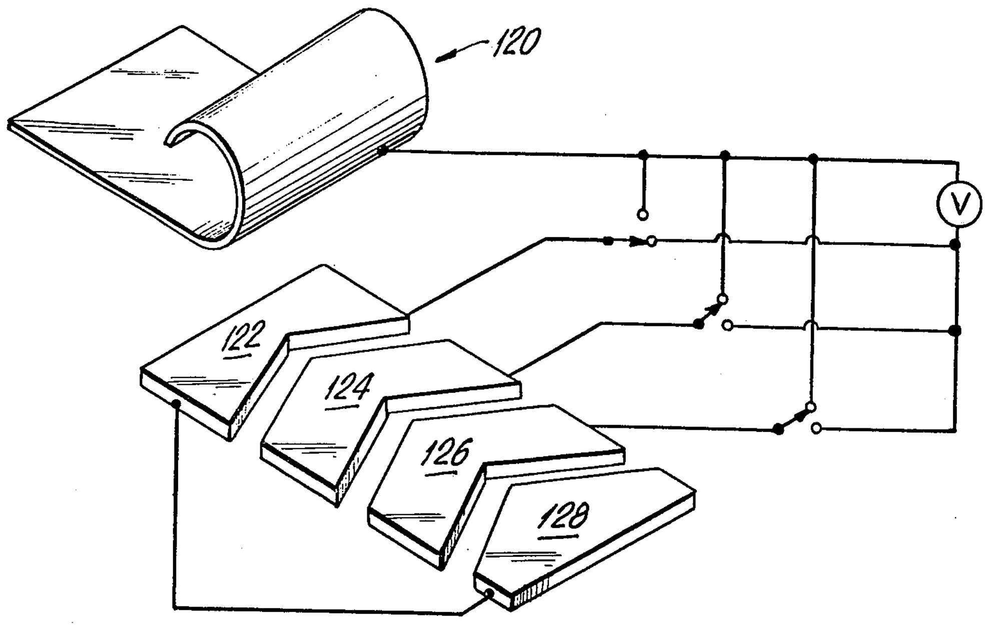
FIG. 9 is a perspective, exploded view illustrating another embodiment of a stationary electrode in a display element.

As shown in the drawings, the display elements of the invention can be of several configurations which can be incorporated into varied display arrays.

FIG. 1 depicts a display element 10 of the invention having a stationary electrode 12, to which is attached a layer of insulative material 14. A moveable electrode 16 has a portion 18 adjacent to one end fixed with respect to the stationary electrode 12 and a free end 20 controllable between a curled position removed from the stationary electrode 12 and an uncurled position adjacent to the stationary electrode 12. The moveable electrode 16 is electrostatically controlled by means of a source of electrical potential V and a control switch 24. When the potential V is connected across the electrodes 12 and 16, the resulting electrostatic forces cause the moveable electrode 16 to uncurl into a position overlying the stationary electrode 12, as shown by dotted lines 26. When the potential V is disconnected and the electrodes connected together, the electrostatic forces decrease and the restitution force of the moveable electrode 16 causes the body portion 20 to curl to its relaxed, curled position removed from the stationary electrode 12.

FIG. 2 shows an embodiment in which the insulative layer 14 is attached to the inner surface of the moveable electrode.

The display element 10 of FIG. 1 can be used for either a light reflective or light transmissive display device. Use in a reflective device is illustrated in FIG. 3. As seen in FIG. 3, when the moveable electrode 16 is curled away from the stationary electrode 12, the viewer sees the light reflected from the area 32, consisting of reflections off the exposed stationary electrode 12 and insulative layer 14, as well as off the exposed portion of inner surface 34 of the moveable electrode 16. When the moveable electrode 16 is flattened to a position overlying the stationary electrode, as shown by dotted lines 26, the viewer sees only the light reflected from outer surface 36 of the moveable electrode.

As a light reflective device, the element can be used in a variety of displays such as in a black and white or a multicolor array. For example, in a black and white display the insulative material layer 14 can be black, the inner surface 34 of the moveable electrode can be black, and the outer surface 36 of the moveable electrode white. In the curled state, no light is reflected and area 32 appears to be black. When the moveable electrode is uncurled or flattened, light is reflected from the white surface. Similarly, in a colored display the exposed surfaces in one state of the device can be of one color with the exposed surfaces in the other state of another color.

The element can also be part of a light transmissive device. Use as such a device is shown in FIG. 4 with the light source 40 on the opposite side of the device from the viewer who sees the transmitted light emanating from area 44. As a light gate device, light is transmitted through a translucent stationary electrode 46 and translucent insulative layer 48. In the flattened condition, an opaque moveable electrode 16 blocks the light. In a multicolor display, the curled condition reveals a color of light transmitted through either a clear or colored stationary electrode 12 and insulative layer 14. The moveable electrode 16 can be opaque, to constitute a color light gate device, or translucent and colored to effect a change of color of the transmitted light.

In addition, other embodiments of devices can be constructed for other light conditions or display effects. For example, a combination reflective and transmissive display can be constructed for use in varying light conditions by use of a translucent reflective coating on the surfaces of the electrodes 12 and 16 whereby the device can be used in a reflective mode when the light source 40 is off, or in a transmissive mode when the light source is on.

In constructing operating embodiments of the invention, several operating variables are to be considered in selecting the materials for use in the electrodes, the insulative layer, and the further components of a display device, such as the substrate. With respect to the moveable electrode, the material used must be capable of being curled to the correct curl size for the particular use. Other considerations include the mass since a lower mass moveable electrode will have a lower inertia and respond more quickly to a given electrostatic force. A further consideration is the stiffness of the material which affects the force needed to bend the material to effect flattening.

In general, a moveable electrode can be formed either of a metal or of a plastic laminate containing a conductive material. In one embodiment, beryllium copper 25 (BeCu 25) foil, 0.0001 inches thick, is curled by wrapping it about a 0.25 inch mandrel and heat treating it to set the curl. The resulting curled sheet is chemically etched into an array of 0.5 inch by 0.5 inch moveable electrodes. Other materials for use in opaque moveable electrodes include tin-alloys and aluminum. Materials for use in translucent electrodes include a translucent base material with a translucent deposited thin conductive layer such as deposited gold, indium oxide, or tin oxide. The materials for moveable electrodes can be provided with the curl by heat forming or can be a laminate of two or more plies bonded together while stressed to form a curl.

Stationary electrodes can be formed of a conductive material such as metal foil for a reflective display, or of a translucent layer of indium oxide or tin oxide on a translucent substrate in a transmissive display.

The insulative layer 14 can also be chosen from many materials. Materials having high dielectric constants are preferred. A polymeric film may be used. One problem encountered in the use of certain materials arises in the temporary retention of a residual electrical charge or polarization after an electric potential has been removed. For example, it has been found that in the embodiment of FIG. 1, the application of sufficient potential to cause the moveable electrode to flatten to a position adjacent to the stationary electrode, may induce a temporary residual polarization in the dielectric insulative layer sufficient to maintain the moveable electrode flattened for a time after the electric potential has been removed or decreased. Certain materials do not exhibit this effect or the effect is small. Cellulose, polypropylene and polyethylene are examples of such materials. Another solution is the use of dielectrics which allow the residual charge to leak off. As another solution to this residual polarization problem, a preferred embodiment of this invention uses an electret formed of material such as polyethylene terephthalate (MYLAR) as the insulative layer. An electret material maintains a relatively constant degree of residual polarization unaffected by the further application of an electric potential across it. Since the residual charge is a constant, it can be accurately accounted for in the design of the element. As an illustration of the use of an electret in an element as shown in FIG. 1, the insulative layer 14 is the electret. Since the electret provides a portion of the attractive force to flatten the moveable electrode, the electric potential V can be of a lower potential to add a further electrostatic force sufficient to cause the moveable electrode 16 to uncurl to a position adjacent to the stationary electrode 12. The removal of the electric potential V results in the recurling return of the moveable electrode to its original curled position since the force provided by the electret is less than the restorative force of the curl bias.

A further embodiment of the invention is illustrated in FIG. 5 where a biasing power source 54 and an incremental drive power source 56 are used to control the moveable electrode 16. The biasing power source 54, set at V volts, is at a voltage potential just below that needed to effect the uncurling of the moveable electrode 16. The incremental drive source 56, set at $\Delta V$ volts, adds sufficient further voltage potential when added to the bias potential to cause the moveable electrode to uncurl and overlie the stationary electrode 12. The use of a bias voltage continually applied across the electrode, requiring only the switching of the $\Delta V$ incremental voltage to effect a change of position of the moveable electrode, can be highly advantageous in a display system. For example, a high voltage power supply can provide the bias voltage for all elements in the array. Only a small incremental potential is necessary to control the elements with the attendant cost savings resulting from the ability to use low voltage switching hardware.

This biasing effect and results are also obtained by the use of an electret as the insulative layer since the charge of the electret serves the same biasing function as bias power source 54. Therefore, only the incremental drive voltage $\Delta V$ is needed to actuate the moveable electrode.

The advantages of this biasing effect are also realizable when a liquid layer is present between the moveable and stationary electrodes. Surface tension forces of the liquid provide a portion of the attractive force acting on the moveable electrode. The liquid thus acts in a manner similar to a bias voltage. Suitable liquids include silicone oil and petroleum oils and derivatives.

The embodiment of FIG. 5 can also be operated with an excess of bias voltage sufficient by itself to maintain the moveable electrode in a flattened position adjacent to the stationary electrode. In this embodiment, the incremental drive voltage 56 is of opposite polarity, sufficient to decrease the electrostatic charge to a level allowing the moveable electrode to recurl to a position removed from the stationary electrode. This embodiment can also take the form of a sufficiently charged electret insulative layer with the incremental drive source 56 of reverse polarity. This embodiment is advantageous in that in the quiescent state with no $\Delta V$ potential applied, the moveable electrode is adjacent to the stationary electrode, rendering the moveable electrode less subject to accidental physical damage.

FIG. 6 illustrates a display element 60 having a stationary electrode 62 with a plurality of discrete conductive regions 66–68, insulative layer 64, and moveable electrode 65. This embodiment provides independently addressable conductive portions of the stationary electrode 62 to facilitate particular control of the display element 60 for use in a display array. In the illustrated embodiment of a three region stationary electrode, for example, an electrical potential can be applied independently to the X electrode region 66, to the Y electrode region 67, or to the hold-down electrode region 68. Only when the X, Y, and hold-down regions are energized, will the moveable electrode 65 fully flatten. Once fully flattened, the hold-down electrode region 68, when energized, provides sufficient electrostatic force to latch the moveable electrode 65 in its flattened state regardless of whether the X or Y electrode regions are energized. To release the electrode 65 from its flattened state, all of the hold-down electrode 68 and the X and Y electrode regions must be de-energized.

When only the X electrode region is energized, that is the conductive region 66 proximate the fixed edge portion 61 of the moveable electrode 65, the moveable electrode will partially uncurl. If, in addition to energization of the X electrode region 66, the Y electrode region 67 is also energized, the moveable electrode 65 will further uncurl. Energization of hold-down electrode region 68, the conductive region most remote from the fixed edge portion 61, will complete the uncurling of moveable electrode 65 to a fully flattened condition.

It should be noted that uncurling can not be effected by any conductive segment which is not immediately adjacent to the curled end portion of the moveable electrode. Therefore, the Y electrode region 67 cannot cause uncurling until the X electrode region 66 has been energized to cause partial uncurling.

In order that the moveable electrode be attracted by the electrostatic field of a particular stationary electrode region, the moveable electrode must sufficiently proximate to that region. This proximity can be achieved by causing the moveable electrode to partially overlie the particular region. One manner of achieving the condition of partial overlying is to shape the stationary regions such that the demarkations between regions are not parallel to the curl axis of the moveable electrode. A chevron shape of the regions provides demarkations which are not parallel to the curl axis such that the moveable electrode partially overlies the adjacent electrode region and thereby is located within the domain of the electrostatic field of that adjacent region when it is subsequently energized.

The operation of the X, Y, hold-down configuration of FIG. 6 is illustrated in FIG. 7 where drive voltage V can be applied between the moveable electrode 65 and any or all of the regions of the stationary electrode, X region 66, Y region 67, or hold-down region 68, by means of switches 70, 71 or 72 respectively. When switch 70 activates the X region 66, the moveable electrode 65 uncurls partially; activation of the Y region 67 provides further uncurling of the moveable electrode 65. Switch 72 activates the hold-down region 68 to fully flatten and latch the moveable electrode 65 even if the switches 70 and 71 subsequently deactivate the X and Y regions 66 and 67.

Control of display elements such as are illustrated in FIGS. 6 and 7 having segmented stationary electrodes provides for use of the elements in a display array in which each element of the array can be selectively actuated without affecting the state of the remainder of the elements in the array. Such a display array is illustrated in FIG. 8 in which a plurality of display elements 81, 82, 83 and 84 are assembled in columns and rows to form a display array 80. The moveable electrodes (not shown) are connected via a common lead 90 to one side of a source of electrical potential 110. Each stationary electrode has an X region, a Y region, and a hold-down region H. All X regions in the first column are connected via a common lead to swtich X1, and all X regions in the second column are connected to switch X2. Similarly, all Y regions in the first row are connected to switch Y1 and all Y regions in the second row are connected to switch Y2. All hold-down regions are connected in common to switch H. Thereby, each element 81–84 can be selectively actuated by selection of the appropriate switches, and latched down by the closure of hold-down switch H.

As an example of the operation of the array in FIG. 8, in order to actuate element 83, hold-down switch H and switch X1 are closed to connect the hold-down and the X electrode regions in the first column to the potential 110, and switch Y2 is closed to connect the Y electrode regions in the second row to the potential 110. Since the element 83 is the only element in the array with both its X and Y electrode regions energized, it alone is caused to fully uncurl. Hold-down switch H will latch element 83 in the flattened state when the X and Y electrode regions are subsequently deactivated. The fact that a moveable electrode can be affected only by a stationary electrode region immediately adjacent the curled portion is of great value in simplifying the circuitry required to control an array of elements.

The display elements illustrated in FIGS. 6 and 7 have two independently controllable stationary electrode conductive regions in addition to the hold-down region. Increasing the number of independently controllable conductive regions in each element permits a significant increase in the number of elements in an array without a concomitant increase in the number of switch devices required. Specifically, in order to independently address an element in an array having a number of elements N, each element having a number of independently controllable conductive regions d, the number of switch elements S required is $$S = d\sqrt[d]{N}$$

For example, for an array of N=390,625 individually controlled picture elements, a single conductive region per element would require 390,625 switches, or one switch per element. If each element has two conductive regions, such as in FIG. 8, 1250 switches are needed to individually control and address each element. If the elements have four regions, only 100 switches are required. The switch devices and all other switch devices referred to in this specification can be mechanical or electronic switches including semiconductor elements which apply one of two potentials to the element to be controlled.

FIG. 9 illustrates an embodiment of an element wherein moveable electrode 120 can be selectively controlled to change its state from either a flattened to a curled position, or from a curled to a flattened position when in a display array. The FIG. 9 element has a stationary electrode formed of an X region 124, Y region 126 and two hold-down regions, 122 and 128. Hold-down region 122 (proximate the fixed edge of the moveable electrode) is partially beneath the moveable electrode 120 when it is fully curled. The other hold-down region 128 is the region most remote from the fixed edge of the moveable electrode 120. The X and Y regions, 124 and 126 respectively, are positioned between the hold-down regions. In other words, the conductive regions are in a series progressing linearly from the fixed edge.

In operation, in order to selectively cause the moveable electrode 120 to change its state from a curled to a fully flattened condition, hold-down regions 122 and 128 are energized, as well as X regions 124 and Y regions 126, in a manner explained in reference to FIG. 8. In this configuration, the hold-down region 122 lying underneath the moveable electrode 120 in its fully curled state, must be activated to partially uncurl the moveable electrode 120 to a position partially overlying X region 124 to enable the X region to cause further uncurling upon activation. When all regions 122, 124, 126 and 128 are activated, the electrode 120 will fully flatten.

In order to selectively cause the moveable electrode 120 to go from a fully flattened condition to a fully curled condition without affecting other display elements in an array, the following operation is performed. At the start, only those moveable electrodes which have their hold-down portions energized are in a fully flattened condition. To selectively release a moveable electrode first all Y regions in the array are energized, then all hold-down portions in the array are deactivated. All X regions are then activated. The moveable electrodes thereby partially curl to a position above the Y region. Deactivation of the X and Y regions in the column and row of the desired element will thereby release that specific moveable electrode and cause that electrode to fully curl. The hold-down regions can then be reactivated to secure the remaining flattened electrodes.

The response speed of an element is related to the size of the element. Sub-dividing an element into a plurality will promote increased response speed. Therefore, the element at a particular address in an array advantageously may be subdivided into two or more elements electrically connected in common.

Figure 10:
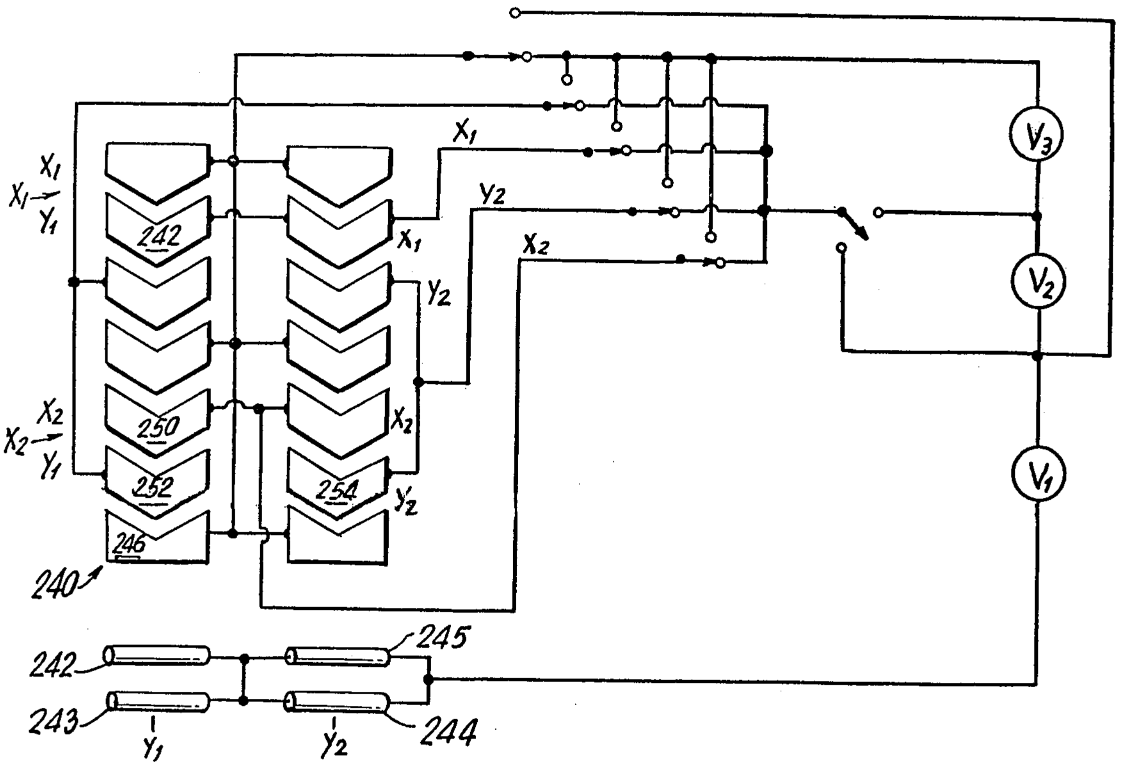
FIG. 10 is a schematic view of an embodiment of a display comprising an array of display elements.

FIG. 10 illustrates the further use of a biasing power source such as described with reference to FIG. 5. In the display array 240 of FIG. 10, four display elements comprise moveable electrodes 242, 243, 244 and 245 and corresponding stationary electrodes having hold-down region 246, $X_1$ row region 248, $X_2$ row regions 250, $Y_1$ column regions 252, and $Y_2$ column regions 254. Bias voltage $V_1$ is continually applied to the electrodes of all elements. Further bias voltage $V_2$ can be selectively applied in series with $V_1$ via switch 247. Incremental drive voltage $V_3$ can be selectively applied in series with $V_1$ and $V_2$. In order to cause a curled moveable electrode to change state, all three potentials $V_1$, $V_2$ and $V_3$ must be applied. To release a flattened electrode, the $V_2$ and $V_3$ potentials must be removed. The $V_1$ potential therefore represents a relatively large bias voltage which can be applied across all elements. The $V_2$ potential reflects the residual polarization of the insulative layer in each element. The $V_3$ potential is of an incremental level to drive an element already biased by $V_1$ and $V_2$. The level of $V_3$ potential is set to allow for the inherent deviations in the amount of potential required to cause a change in state in various individual display elements stemming from manufacturing variations in such element parameters as insulative layer thickness, dielectric characteristics and curl diameter. It has been found that the $V_3$ potential may be in the order of ten percent of the $V_1+V_2$ level. In the biasing configuration of FIG. 10, the curls can be controlled to selectively cause their change of state from a curled to an uncurled position by control of $V_3$ alone, once the biasing voltages $V_1$ and $V_2$ have been applied. The control switches required in a display array can be operated at the lower $V_3$ voltage, with fewer switches needed at the higher $V_1$ or $V_2$ voltages, with attendent savings in manufacturing cost.

Figure 11A:
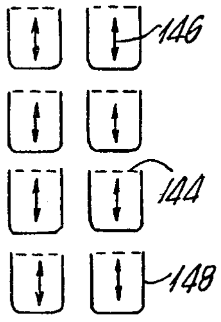
FIGS. 11A–11C are plan views of various embodiments of stationary electrodes.
Figure 11B:
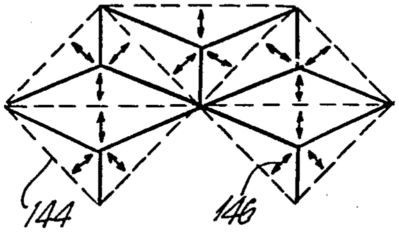
Figure 11C:
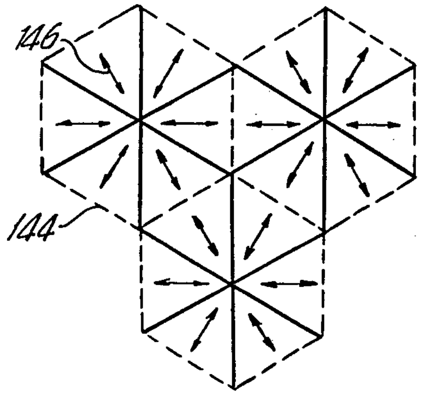

The present invention can be used to create a digitally controlled two color, or black and white, display with desired gray scales, or a color display with desired intensities of the three primary colors. Various procedures for creating the gray scale and color shades are discussed here. FIG. 11 shows a plan view of element arrangements to create gray scales. FIG. 11*a* shows the use of curls 148 which have square or rectangular shapes in the plan view. FIGS. 11*b* and 11*c*, respectively, show the use of triangular shapes. To create an 80% black gray scale, 20% of the elements are curled. When the curled position represents white, 60% of the elements are curled to create 40% black gray scale. In all these examples, the dotted lines, 144 represent the curl axes of the elements and the straight solid lines represent the element perimeters. The arrows 146 show the curl direction.

Various shade scales can be accomplished by grouping plural elements. The number of shade combinations available in a group is $S=2^N$ where N is the number of differently shaded elements. Thus, four elements will provide 16 shade combinations, ranging from no actuation to all elements fully actuated.

Another procedure for the creation of different two color scales and primary color shades is through the control of the duty (up and down) cycles of elements. Therefore, a black and white element, (where white is the curled position) when cycled faster than the ability of the eye to perceive the movement, would appear to be the percentage of the duty cycle devoted to the coiled up state vs. the flat (black) state. Where S is the number of different shade combinations achieved from N different discrete and additive duty cycles, then S=2. Therefore, for four different discrete and additive duty cycles 16 different shades can be created.

Figure 12:
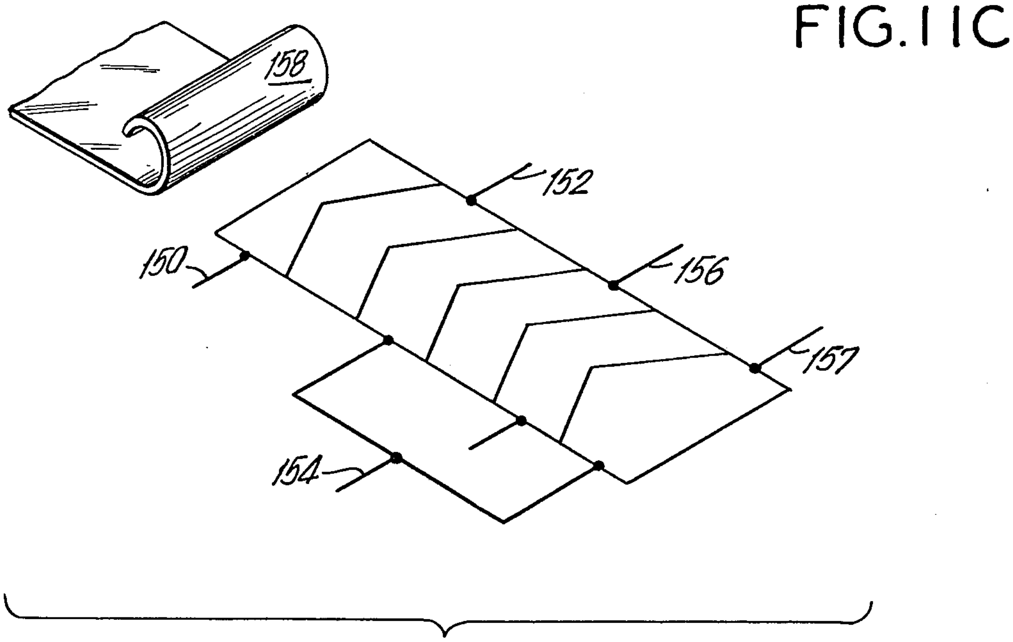
FIG. 12 is a perspective view of an embodiment used to create grey scales and primary color scales.

FIG. 12 shows another way to make use of the present invention to create gray scales and primary color scales shade. Separately driven X and Y, electrode regions 150, 152 pull the selected moveable electrode 158 to the first hold-down electrode 154 representing a gray or shade scale. Additional separately driven regions $X_2$ and $X_3$, 156 and 157 are used to pull the selected electrode to the second hold-down electrode region 154 to create another gray or shade scale. Additional X, Y and hold-down electrode regions to create additional selectable shades or gray scales can be provided.

I claim:

1. An electrostatically actuated element for an electrically operated light control device, said element comprising;

a planar stationary electrode, an electrode moveable between a position overlying the stationary electrode and a position removed from the stationary electrode, and non-conductive means between the electrodes for keeping the electrodes electrically separated, the moveable electrode being in the form of a sheet of flexible material having one end fixed with respect to the stationary electrode and the opposite end free with respect to the stationary electrode, the sheet having a permanent mechanical stress which biases the sheet into a curl away from the stationary electrode to remove the moveable electrode from the stationary electrode in the absence of applied force, the stationary electrode being separated in linear arrangement along the path of movement into a plurality of discrete conductive regions arranged as a series progressing from the vicinity of the fixed end of the moveable electrode, the mechanical stress being insufficient to overcome the electrostatic force created when an electrical potential is applied between the moveable electrode and a conductive region adjacent the moveable electrode to cause the moveable electrode to overlie the conductive region.

2. The element of claim 1 wherein the moveable electrode is a metal foil.

3. The element of claim 1 wherein the moveable electrode is a sheet of polymeric material having a conductive coating on at least one surface.

4. The element of claim 3 wherein the conductive coating is only on the surface of the sheet remote from the stationary electrode and the non-conductive means is the sheet of polymeric material.

5. The element of claim 1 wherein the non-conductive means is a layer of insulating material overlying the stationary electrode.

6. The element of claim 1 wherein the non-conductive means is a layer of insulating material on the surface of the moveable electrode proximate the stationary electrode.

7. The element of claim 1 wherein the stationary electrode comprises a non-conductive substrate having a conductive layer.

8. The element of claim 1 wherein the separations between the conductive regions of the stationary electrode are not parallel to the axis of the curl of the moveable electrode.

9. An electrostatically actuated element for an electrically operated light control device, said element comprising, in superposition;

a planar stationary electrode, an electrode moveable between a position overlying the stationary electrode and a position removed from the stationary electrode, and a sheet of electret material which also serves as non-conductive means between the electrodes for keeping the electrodes electrically separated, the moveable electrode being in the form of a sheet of flexible material having one end fixed with respect to the stationary electrode and the opposite end free with respect to the stationary electrode, the sheet of flexible material having a permanent mechanical stress which biases the sheet into a curl away from the stationary electrode, the electret material being capable of retaining an electrostatic charge to provide an electrostatic force to act upon the moveable electrode, the element being actuated by the algebraic sum of the electrostatic force provided by the electret material and the electrostatic force created when an electrical potential is applied to the electrodes.

10. The element of claim 9 wherein the electrostatic force provided by the electret material is sufficient to overcome the mechanical stress to cause the moveable electrode to overlie the stationary electrode in the absence of an electrical potential applied to said electrodes, and the potential, when applied, reduces the electrostatic force provided by the electret material.

11. The element of claim 9 wherein the electrostatic force provided by the electret material is insufficient to overcome the mechanical stress and the electrical potential, when applied to the electrodes, creates an electrostatic force acting in the same direction to that provided by the electret material, the algebraic sum of the electrostatic forces being sufficient to overcome the mechanical stress to cause the moveable electrode to overlie the stationary electrode.

12. An electrostatically actuated element for an electrically operated light control device, said element comprising, in superposition, a planar stationary electrode, an electrode moveable between a position overlying the stationary electrode and a position removed from the stationary electrode, non-conductive means between the electrodes for keeping the electrodes electrically separated, and a layer of liquid between the electrodes, the moveable electrode being in the form of a sheet of flexible material having one end fixed with respect to the stationary electrode and the opposite end free with respect to the stationary electrode, the sheet of flexible material having a permanent mechanical stress which biases the sheet into a curl away from the stationary electrode, the liquid providing an attractive force when the moveable electrode overlies the stationary electrode which force opposes a portion of the curl bias of the moveable electrode, the element being actuated by the algebraic sum of the attractive force provided by the liquid and the electrostatic force created when an electrical potential is applied to the electrodes.

13. An electrically operated light control device comprising an array of a plurality of electrostatically actuated elements, each element comprising;

a planar stationary electrode, an electrode moveable between a position overlying the stationary electrode and a position removed from the stationary electrode, and non-conductive means between the electrodes for keeping the electrodes electrically separated, the moveable electrode being in the form of a sheet of flexible material having one end fixed with respect to the stationary electrode and the opposite end free with respect to the stationary electrode, the sheet having a permanent mechanical stress which biases the sheet into a curl away from the stationary electrode to remove the moveable electrode from the stationary electrode in the absence of applied force, the stationary electrode having, in linear arrangement along the path of movement, a plurality of discrete conductive regions arranged as a series progressing from the vicinity of the fixed end of the moveable electrode, the mechanical stress being insufficient to overcome the electrostatic force created when an electrical potential is applied between the moveable electrode and a conductive region adjacent the moveable electrode to cause the moveable electrode to overlie the conductive region.

14. The device of claim 13 including means for independent connection of each conductive region of the stationary electrodes of the elements to a source of electrical potential.

15. The device of claim 14 wherein a first group of elements within the array has connected together all of the conductive regions located in a first position in the linear arrangement, and wherein a second group of elements, having at least one element in common with the first group, has connected together all of the conductive regions located in a second position adjacent the first position.

16. The device of claim 14 wherein the elements are arranged in an array of columns and rows, in each row all of the conductive regions in a first position in the series are connected together, and in each column all of the conductive regions in a second position in the series are connected together.

17. The device of claim 13 wherein a conductive region of the stationary electrodes of each element is independently connectable to a plurality of sources of electrical potential.

18. An element for a light control device comprising;

a member moveable by the attraction of an electrostatic force field, a stationary member along which the moveable member can advance, the stationary member having, in linear arrangement along the path of movement, a plurality of independently actuatable electrode region means for generating electrostatic attractive force fields, the moveable member being advancable to overlie an electrode region only when the moveable member previously has been positioned with its leading end adjacent the actuated region.

19. The element of claim 18 including restorative force means to bias the moveable member to retreat the moveable member from an electrode region when the region is not actuated, the restorative force being insufficient to overcome the attractive force created when the region is actuated.

20. The element of claim 19 wherein the attractive force is the algebraic sum of a bias force, an incremental force, and a residual force, and wherein the sum of the bias and residual forces is less than the restorative force.

21. The element of claim 20 wherein the incremental force is an electrostatic force created by an incremental voltage.

22. The element of claim 21 wherein the bias force is an electrostatic force created by a bias voltage.

23. The element of claim 22 wherein the magnitude of the bias voltage is greater than that of the incremental voltage.

24. The element of claim 20 wherein the bias force is an electrostatic force created by an electret.

25. The element of claim 20 wherein the residual force is an electrostatic force due to retention of residual charge by the element.

26. The element of claim 20 wherein the bias force is due to the presence of a liquid between the moveable and stationary members.

27. An electrically operated light control device comprising an array of a plurality of electrostatically actuated elements, each element comprising;

a member moveable by the attraction of an electrostatic force field, a stationary member along which the moveable member can advance, the stationary member having, in linear arrangement along the path of movement, a plurality of independently actuatable electrode region means for generating electrostatic force fields, the moveable member being advancable to overlie an electrode region only when the moveable member previously has been positioned with its leading end adjacent the actuated region.

* * * * *